United States Patent
Telefus

(10) Patent No.: US 9,621,053 B1
(45) Date of Patent: Apr. 11, 2017

(54) PEAK POWER CONTROL TECHNIQUE FOR PRIMARY SIDE CONTROLLER OPERATION IN CONTINUOUS CONDUCTION MODE

(71) Applicant: Flextronics AP, LLC, Broomfield, CO (US)

(72) Inventor: Mark Telefus, Orinda, CA (US)

(73) Assignee: Flextronics AP, LLC, Broomfield, CO (US)

(*) Notice: Subject to any disclaimer, the term of this patent is extended or adjusted under 35 U.S.C. 154(b) by 108 days.

(21) Appl. No.: 14/452,443

(22) Filed: Aug. 5, 2014

(51) Int. Cl.
*H02M 3/335* (2006.01)
*H02M 1/00* (2006.01)

(52) U.S. Cl.
CPC .... *H02M 3/33507* (2013.01); *H02M 3/33523* (2013.01); *H02M 2001/0025* (2013.01)

(58) Field of Classification Search
CPC ............ Y02B 70/126; H02M 3/33507; H02M 3/33523; H02M 3/158; H02M 3/156; H02M 3/1584; H02M 2001/0058; H02M 2001/0032; H02M 2001/0025; H02M 2001/0009
See application file for complete search history.

(56) References Cited

U.S. PATENT DOCUMENTS

| | | | |
|---|---|---|---|
| 4,077,061 A | 2/1978 | Johnston | |
| 4,122,359 A | 10/1978 | Breikss | |
| 4,234,920 A | 11/1980 | Van Ness | |
| 4,245,289 A | 1/1981 | Mineck | |
| 4,273,406 A | 6/1981 | Okagami | |
| 4,327,298 A | 4/1982 | Burgin | |
| 4,370,703 A | 1/1983 | Risberg | |
| 4,381,457 A | 4/1983 | Wiles | |
| 4,489,394 A | 12/1984 | Borg | |

(Continued)

FOREIGN PATENT DOCUMENTS

| | | | |
|---|---|---|---|
| JP | 4217869 A | 8/1992 | |
| JP | 10243640 A | 9/1998 | |

(Continued)

OTHER PUBLICATIONS

EE Times.com-"Team Claims Midrange Wireless Energy Transfer", by R. Colin Johnson, 4 pages, Nov. 6, 2007.

(Continued)

*Primary Examiner* — Gustavo Rosario Benitez
(74) *Attorney, Agent, or Firm* — Haverstock & Owens LLP

(57) ABSTRACT

A power converter includes a primary side controller configured to operate the power converter in the discontinuous conduction mode during low to mid-power requirements and to operate the power converter in the continuous conduction mode during high or peak power requirements. The power converter includes a primary side auxiliary winding that provides a feedback signal to the primary side controller, and an adjusted resistor and diode circuit which is coupled to a multi-function feedback (FB) pin of the primary side controller. The primary side controller monitors for a peak power demand, upon detection of which a negative supply rail is enabled, which is used to compensate for voltage losses due to non-zero current while operating in the CCM, thereby enabling output voltage regulation while operating in the CCM during peak power demand.

19 Claims, 5 Drawing Sheets

(56) References Cited

U.S. PATENT DOCUMENTS

| | | |
|---|---|---|
| 4,535,410 A | 8/1985 | O'Mara |
| 4,563,731 A | 1/1986 | Sato et al. |
| 4,611,289 A | 9/1986 | Coppola |
| 4,642,616 A | 2/1987 | Goodwin |
| 4,645,278 A | 2/1987 | Yevak et al. |
| 4,658,204 A | 4/1987 | Goodwin |
| 4,703,191 A | 10/1987 | Ferguson |
| 4,712,160 A | 12/1987 | Sato et al. |
| 4,742,424 A | 5/1988 | Kautzer |
| 4,750,040 A | 6/1988 | Hakamada |
| 4,788,626 A | 11/1988 | Neidig et al. |
| 4,806,110 A | 2/1989 | Lindeman |
| 4,841,220 A | 6/1989 | Tabisz et al. |
| 4,857,822 A | 8/1989 | Tabisz et al. |
| 4,866,367 A | 9/1989 | Ridley et al. |
| 4,884,242 A | 11/1989 | Lacy |
| 4,890,217 A | 12/1989 | Conway |
| 4,893,227 A | 1/1990 | Gallios et al. |
| 4,899,256 A | 2/1990 | Sway-Tin |
| 4,901,069 A | 2/1990 | Veneruso |
| 4,985,804 A | 1/1991 | Campbell |
| 5,065,302 A | 11/1991 | Kanazawa |
| 5,090,919 A | 2/1992 | Tsuji |
| 5,101,322 A | 3/1992 | Ghaem et al. |
| 5,105,182 A | 4/1992 | Shindo |
| 5,132,890 A | 7/1992 | Blandino |
| 5,235,491 A | 8/1993 | Weiss |
| 5,283,792 A | 2/1994 | Davies, Jr. |
| 5,325,283 A | 6/1994 | Farrington |
| 5,365,403 A | 11/1994 | Vinciarelli et al. |
| 5,373,432 A | 12/1994 | Vollin |
| 5,437,040 A | 7/1995 | Campbell |
| 5,442,540 A | 8/1995 | Hua |
| 5,673,185 A | 9/1997 | Albach et al. |
| 5,712,772 A | 1/1998 | Telefus et al. |
| 5,717,936 A | 2/1998 | Uskali |
| 5,724,026 A | 3/1998 | Allen |
| 5,786,992 A | 7/1998 | Vinciarelli et al. |
| 5,790,395 A | 8/1998 | Hagen |
| 5,811,895 A | 9/1998 | Suzuki et al. |
| 5,838,171 A | 11/1998 | Davis |
| 5,838,554 A | 11/1998 | Lanni |
| 5,841,641 A | 11/1998 | Faulk |
| 5,859,771 A | 1/1999 | Kniegl |
| 5,903,452 A | 5/1999 | Yang |
| 5,905,369 A | 5/1999 | Ishii et al. |
| 5,923,543 A | 7/1999 | Choi |
| 5,949,672 A | 9/1999 | Bertnet |
| 5,974,551 A | 10/1999 | Lee |
| 5,982,153 A | 11/1999 | Nagai et al. |
| 6,009,008 A | 12/1999 | Pelly |
| 6,091,611 A | 7/2000 | Lanni |
| 6,183,302 B1 | 2/2001 | Daikuhara et al. |
| 6,191,957 B1 | 2/2001 | Peterson |
| 6,272,015 B1 | 8/2001 | Mangtani |
| 6,275,397 B1 | 8/2001 | McClain |
| 6,301,133 B1 | 10/2001 | Cuadra |
| 6,307,761 B1 | 10/2001 | Nakagawa |
| 6,323,627 B1 | 11/2001 | Schmiederer et al. |
| 6,333,650 B1 | 12/2001 | Amin |
| 6,385,059 B1 | 5/2002 | Telefus et al. |
| 6,385,061 B1 * | 5/2002 | Turchi .............. H02M 1/34 323/902 |
| 6,388,897 B1 | 5/2002 | Ying et al. |
| 6,390,854 B2 | 5/2002 | Yamamoto et al. |
| 6,396,716 B1 | 5/2002 | Liu et al. |
| 6,452,816 B2 | 9/2002 | Kuranki |
| 6,459,175 B1 | 10/2002 | Potega |
| 6,480,809 B1 | 11/2002 | Slaight |
| 6,487,098 B2 | 11/2002 | Malik et al. |
| 6,535,996 B1 | 3/2003 | Brewer |
| 6,549,409 B1 | 4/2003 | Saxelby et al. |
| 6,578,253 B1 | 6/2003 | Herbert |
| 6,721,192 B1 | 4/2004 | Yang et al. |
| 6,768,222 B1 | 7/2004 | Ricks |
| 6,775,162 B2 | 8/2004 | Mihai et al. |
| 6,894,461 B1 | 5/2005 | Hack et al. |
| 6,919,715 B2 | 7/2005 | Muratov et al. |
| 6,989,997 B2 | 1/2006 | Xu |
| 6,990,000 B1 | 1/2006 | Rodriguez et al. |
| 7,035,126 B1 | 4/2006 | Lanni |
| 7,038,406 B2 | 5/2006 | Wilson |
| 7,102,251 B2 | 9/2006 | West |
| 7,139,180 B1 | 11/2006 | Herbert |
| 7,202,640 B2 | 4/2007 | Morita |
| 7,208,833 B2 | 4/2007 | Nobori et al. |
| 7,212,420 B2 | 5/2007 | Liao |
| 7,215,560 B2 | 5/2007 | Soldano |
| 7,239,532 B1 | 7/2007 | Hsu et al. |
| 7,274,175 B2 | 9/2007 | Manolescu |
| 7,315,460 B2 | 1/2008 | Kyono |
| 7,386,286 B2 | 6/2008 | Petrovic et al. |
| 7,395,452 B2 | 7/2008 | Nicholson |
| 7,443,700 B2 | 10/2008 | Yan |
| 7,450,388 B2 | 11/2008 | Beihoff et al. |
| 7,564,706 B1 | 7/2009 | Herbert |
| 7,570,037 B2 | 8/2009 | Li |
| 7,596,007 B2 | 9/2009 | Phadke |
| 7,605,570 B2 | 10/2009 | Moon et al. |
| 7,630,221 B2 | 12/2009 | Sui et al. |
| 7,679,347 B2 | 3/2010 | He |
| 7,701,305 B2 | 4/2010 | Lin et al. |
| 7,924,578 B2 | 4/2011 | Jansen et al. |
| 8,018,743 B2 | 9/2011 | Wang |
| 8,059,429 B2 | 11/2011 | Huynh |
| 8,059,434 B2 | 11/2011 | Huang et al. |
| 8,094,473 B2 | 1/2012 | Moon et al. |
| 8,102,678 B2 | 1/2012 | Jungreis |
| 8,126,181 B2 | 2/2012 | Yamamoto et al. |
| 8,134,848 B2 | 3/2012 | Whittam et al. |
| 8,155,368 B2 | 4/2012 | Cheung et al. |
| 8,193,662 B1 | 6/2012 | Carlson |
| 8,194,417 B2 | 6/2012 | Chang |
| 8,199,541 B2 | 6/2012 | Yang |
| 8,207,717 B2 | 6/2012 | Urono et al. |
| 8,233,298 B2 | 7/2012 | Jamg |
| 8,243,472 B2 | 8/2012 | Chang et al. |
| 8,363,434 B2 | 1/2013 | Lin |
| 8,369,111 B2 | 2/2013 | Balakrishnan et al. |
| 8,385,032 B1 | 2/2013 | Mao et al. |
| 8,400,801 B2 | 3/2013 | Shinoda |
| 8,654,553 B1 | 2/2014 | Ye |
| 8,749,210 B1 | 6/2014 | Nakao et al. |
| 8,770,597 B1 | 7/2014 | Xu |
| 9,007,087 B2 | 4/2015 | Avritch |
| 9,048,028 B2 | 6/2015 | Tajima |
| 2002/0008963 A1 | 1/2002 | Dibene et al. |
| 2002/0011823 A1 | 1/2002 | Lee |
| 2002/0036200 A1 | 3/2002 | Ulrich |
| 2002/0121882 A1 | 9/2002 | Matsuo |
| 2002/0196644 A1 * | 12/2002 | Hwang .............. H02M 1/0845 363/89 |
| 2003/0035303 A1 | 2/2003 | Balakrishnan et al. |
| 2003/0112645 A1 | 6/2003 | Schlecht |
| 2004/0183510 A1 | 9/2004 | Sutardja et al. |
| 2004/0255259 A1 | 12/2004 | Huber et al. |
| 2005/0024016 A1 | 2/2005 | Breen et al. |
| 2005/0036338 A1 | 2/2005 | Porter et al. |
| 2005/0117376 A1 | 6/2005 | Wilson |
| 2005/0138437 A1 | 6/2005 | Allen et al. |
| 2005/0194942 A1 | 9/2005 | Hack et al. |
| 2005/0218942 A1 | 10/2005 | Yamashita |
| 2005/0225257 A1 | 10/2005 | Green |
| 2005/0254268 A1 | 11/2005 | Reinhard et al. |
| 2006/0002155 A1 | 1/2006 | Shteynberg et al. |
| 2006/0022637 A1 | 2/2006 | Wang et al. |
| 2006/0146461 A1 | 7/2006 | Jones |
| 2006/0152947 A1 | 7/2006 | Baker et al. |
| 2006/0198172 A1 | 9/2006 | Wood |
| 2006/0208711 A1 | 9/2006 | Soldano |
| 2006/0213890 A1 | 9/2006 | Kooken et al. |
| 2006/0232220 A1 | 10/2006 | Melis |
| 2007/0040516 A1 | 2/2007 | Chen |
| 2007/0067659 A1 | 3/2007 | Tevanian |

(56) References Cited

U.S. PATENT DOCUMENTS

| | | |
|---|---|---|
| 2007/0120542 A1 | 5/2007 | LeMay |
| 2007/0121981 A1 | 5/2007 | Koh et al. |
| 2007/0138971 A1 | 6/2007 | Chen |
| 2007/0247091 A1 | 10/2007 | Maiocchi |
| 2007/0263415 A1 | 11/2007 | Jansen et al. |
| 2007/0279955 A1 | 12/2007 | Liu |
| 2008/0002444 A1 | 1/2008 | Shekhawat |
| 2008/0018265 A1 | 1/2008 | Lee et al. |
| 2008/0043496 A1 | 2/2008 | Yang |
| 2008/0130322 A1 | 6/2008 | Artusi |
| 2008/0130325 A1* | 6/2008 | Ye .................. H02M 3/33507 363/21.14 |
| 2008/0191667 A1 | 8/2008 | Kernahan et al. |
| 2008/0270809 A1 | 10/2008 | Hoffer |
| 2009/0034299 A1 | 2/2009 | Lev |
| 2009/0045889 A1 | 2/2009 | Goergen et al. |
| 2009/0089604 A1 | 4/2009 | Malik |
| 2009/0168472 A1 | 7/2009 | Chung |
| 2009/0196073 A1 | 8/2009 | Nakahori |
| 2009/0230929 A1 | 9/2009 | Sui et al. |
| 2009/0290384 A1 | 11/2009 | Jungreis |
| 2010/0002480 A1* | 1/2010 | Huynh ................. H02M 3/335 363/90 |
| 2010/0039833 A1 | 2/2010 | Coulson et al. |
| 2010/0103711 A1 | 4/2010 | Komatsuzaki |
| 2010/0115150 A1 | 5/2010 | Hachiya |
| 2010/0250457 A1 | 9/2010 | Chen |
| 2010/0254057 A1 | 10/2010 | Chen |
| 2010/0277837 A1 | 11/2010 | Myhre |
| 2010/0289466 A1* | 11/2010 | Telefus .................. H02M 1/12 323/282 |
| 2010/0322441 A1 | 12/2010 | Weiss et al. |
| 2010/0332857 A1* | 12/2010 | Vogman ................. G06F 1/263 713/300 |
| 2011/0013437 A1* | 1/2011 | Uruno ................. H02M 1/4208 363/126 |
| 2011/0037444 A1 | 2/2011 | Wildash |
| 2011/0096573 A1 | 4/2011 | Zhu et al. |
| 2011/0096574 A1* | 4/2011 | Huang .............. H02M 3/33507 363/21.18 |
| 2011/0109248 A1 | 5/2011 | Liu |
| 2011/0112700 A1 | 5/2011 | Tajima |
| 2011/0132899 A1 | 6/2011 | Shimomugi et al. |
| 2011/0157924 A1 | 6/2011 | Huynh |
| 2011/0213999 A1 | 9/2011 | Lecourtier |
| 2011/0215647 A1 | 9/2011 | Lecourtier |
| 2011/0222318 A1 | 9/2011 | Uno |
| 2011/0255311 A1 | 10/2011 | Hsu et al. |
| 2011/0261590 A1 | 10/2011 | Liu |
| 2012/0042185 A1 | 2/2012 | Lee |
| 2012/0069609 A1 | 3/2012 | Christophe et al. |
| 2012/0112657 A1 | 5/2012 | Van Der Veen et al. |
| 2012/0144183 A1 | 6/2012 | Heinrichs |
| 2012/0153866 A1 | 6/2012 | Liu |
| 2012/0153917 A1 | 6/2012 | Adell |
| 2012/0268084 A1 | 10/2012 | Wang et al. |
| 2013/0003427 A1 | 1/2013 | Pan |
| 2013/0016545 A1 | 1/2013 | Xu |
| 2013/0049709 A1 | 2/2013 | Fu et al. |
| 2013/0155728 A1 | 6/2013 | Melanson |
| 2013/0250629 A1 | 9/2013 | Xu |
| 2013/0329469 A1 | 12/2013 | Kubota |
| 2014/0008979 A1 | 1/2014 | Kinnard |
| 2014/0078790 A1* | 3/2014 | Lin .................. H02M 3/33507 363/21.16 |
| 2014/0153299 A1 | 6/2014 | Jeong et al. |
| 2014/0233275 A1* | 8/2014 | Yang .................. H02M 3/33576 363/21.17 |
| 2014/0268912 A1 | 9/2014 | Telefus |
| 2015/0002108 A1 | 1/2015 | Kim |
| 2015/0052390 A1 | 2/2015 | Dryer |

FOREIGN PATENT DOCUMENTS

| | | |
|---|---|---|
| JP | 2000083374 A | 3/2000 |
| JP | 20000253648 A | 9/2000 |
| JP | 2004208357 A | 7/2004 |

OTHER PUBLICATIONS

EE Times. com-"Wireless Beacon Could Recharge Consumer Devices", by R. Colin Johnson, 3 pages, Nov. 6, 2007.

Novel Zero-Voltage and Zero-Current Switching (ZVZCS) Full Bridge PWM converter Using Coupled Output Inductor, Sep. 2002 IEEE, pp. 641-648.

"New Architectures for Radio-Frequency dc/dc Power Conversion", Juan Rivas et al., Laboratory for Electromagnetic and Electronic Systems, Jan. 2004, Massachusetts Institute of Technology, Room 10-171 Cambridge, MA 02139, pp. 4074-4084.

"Randomized Modulation in Power Electronic Converters". Aleksander M. Stankovic, member IEEE, and Hanoch Lev-Ari, vol. 90, No. 5, May 2002, pp. 782-799.

"Analysis and Special Characteristics of a Spread-Spectrum Technique for Conducted EMI Suppression", K.K. tse, et al. Member IEEE, IEEE Transactions on Power Electronics, vol. 15., No. 2, Mar. 2000, pp. 399-410.

"Practical on-Line Identification of Power Converter Dynamic Respones", Botao Miao et al., Colorado Power Electronics Center, ECE Department, 2005, pp. 57-62.

"A Modified Cross-Correlation Method for System Identification of Power Converters with Digital Control", Botao Miao et al., Colorado Power Electronics Center, ECE Department, 2004, pp. 3728-3733.

"Design and Implementation of an Adaptive Tuning System Based on Desired Phase Margin for Digitally Controlled DC-DC Converters", Jeffrey Morroni et al., Member IEEE, 2009, pp. 559-564.

Non-Final Office Action mailed Jul. 12, 2016. U.S. Appl. No. 13/924,402, filed Jun. 21, 2013, 12 pages.

Non-Final Office Action mailed Jul. 21, 2016. U.S. Appl. No. 13/924,388, filed Jun. 21, 2013, 16 pages.

* cited by examiner

PEAK POWER CONTROL TECHNIQUE FOR PRIMARY SIDE CONTROLLER OPERATION IN CONTINUOUS CONDUCTION MODE

FIELD OF THE INVENTION

The present invention relates to the field of power converters. More particularly, the present invention relates to the control of power converters.

BACKGROUND

In many applications a power converter is required to provide a voltage within a predetermined range formed from a voltage source having a different voltage level. Some circuits are subject to uncertain and undesirable functioning and even irreparable damage if supplied power falls outside a certain range. More specifically, in some applications, a precise amount of power is required at known times. This is referred to as regulated power supply. In order to control a power converter to deliver a precise amount of power as conditions require, some form of control of the power converter is required. This control can occur on the primary side of an isolation transformer or the secondary side. A closed loop feedback control system is a system that monitors some element in the circuit, such as the circuit output voltage, and its tendency to change, and regulates that element at a substantially constant value. Control on the secondary side of a power converter can use a monitored output voltage as feedback control, but requires the use of some communication from the secondary to the primary side of the isolation transformer to control the primary side switching element. Control on the primary side can readily control the primary side switching element, but requires some feedback mechanism from the secondary side to the primary side to convey the status of the monitored element. In some applications, an optical coupler circuit, or opto coupler, is used to transmit feedback signals while maintaining electrical isolation between the primary and secondary sides.

FIG. 1 illustrates a conventional regulated switch mode power converter including an optical coupler circuit. The power converter 2 is configured as a traditional flyback type converter. The power converter 2 includes an isolation transformer 4 having a primary winding P1 and a secondary winding S1. The primary winding P1 is electrically coupled to an input voltage Vin and a driving circuit including a transistor 8, a resistor 12, and a controller 10. A capacitor 28 is coupled across the input Vin and coupled with the primary winding P1. Input voltage to the circuit may be unregulated DC voltage derived from an AC supply after rectification and filtering. The transistor 8 is a fast-switching device, such as a MOSFET, the switching of which is controlled by the fast dynamic controller 10 to maintain a desired output voltage Vout. The controller 10 is coupled to the gate of the transistor 8. As is well known, the DC/DC conversion from the primary winding P1 to the secondary winding S1 is determined by the duty cycle of the PWM switching signal provided to the transistor 8. The secondary winding voltage is rectified and filtered using the diode 6 and the capacitor 22. A sensing circuit and a load 14 are coupled in parallel to the secondary winding S1 via the diode 6. The sensing circuit includes a resistor 16, a resistor 18, and a sensing circuit 20. The sensing circuit 20 senses the output voltage Vout across the load.

In this configuration, the power converter is controlled by driving circuitry on the primary side, and the load coupled to the output is isolated from the control. As such, a monitored output voltage used for voltage regulation is required as feedback from the secondary side to the control on the primary side. The power converter 2 has a voltage regulating circuit that includes the secondary controller 20 and an optical coupler circuit. The optical coupled circuit includes two galvanically isolated components, an optical diode 24 coupled to the secondary controller 20 and an optical transistor 26 coupled to the controller 10. The optical diode 24 provides optical communication with the optical transistor 26 across the isolation barrier formed by the transformer 4. The optical coupler circuit in cooperation with the sensing circuit 20 provides feedback to the controller 10. The controller 10 accordingly adjusts the duty cycle of the transistor 8 to compensate for any variances in an output voltage Vout.

However, the use of an optical coupler circuit in and of itself presents issues. Firstly, the optical coupler circuit adds extra cost. In some applications, the optical coupler circuit can add more cost to the power converter than the isolation transformer. The optical coupler circuit also adds to manufacturing and testing costs. Furthermore, the performance of the optical coupler circuit degrades over time and therefore introduces another potential point of failure in the overall power converter. Also, characteristics of the optical coupler circuit must be accounted for in the overall circuit design. For example, the optical diode component is non-linear and as such a correlation between the optical diode and the optical transistor must be established. The optical coupler circuit also has delays related to the operation of the optical diode and the optical transistor, and the operation of the optical diode requires a well defined DC level. As a result, it is generally desirable to avoid the use of an optical coupler circuit.

A next generation of feedback control does not use optical control circuitry. Instead, the transformer is used to convey real-time feedback signaling from the secondary side to the primary side. In such an application, the transformer includes an auxiliary winding on the primary side that is magnetically coupled to the secondary winding. FIG. 2 illustrates a conventional regulated power converter including a magnetically coupled feedback circuit. The power converter 32 is configured as a traditional flyback type converter. The power converter 32 includes an isolation transformer 34 having a primary winding P1 and a secondary winding S1. The primary winding P1 is electrically coupled to an input voltage Vin and a driving circuit including a transistor 44, a resistor 46, and a controller 42. A capacitor 58 is coupled across the input Vin and coupled with the primary winding P1. Input voltage to the circuit may be unregulated DC voltage derived from an AC supply after rectification and filtering. Similar to the power converter in FIG. 1, the transistor 44 is a fast-switching device controlled by the fast dynamic controller 42 to maintain a desired output voltage Vout. The secondary winding voltage is rectified and filtered using the diode 36 and the capacitor 38, with the output voltage Vout delivered to the load 40.

The power converter 32 has a feedback loop that includes a magnetically coupled feedback circuit coupled to the secondary winding S1 of the transformer 34 and the controller 42. The magnetically coupled feedback circuit includes a diode 48, a capacitor 50, resistors 52 and 54 and an auxiliary winding 56. The auxiliary winding 56 is coupled in parallel to the series of resistors 52 and 54.

The voltage VA is proportional to the voltage across the auxiliary winding 56. The voltage VA is provided as a feedback voltage VFB to the controller 42. The current through the transistor 44 is also provided as feedback current IFB to the controller 42. The controller 42 includes a real-time waveform analyzer that analyzes input feedback signals, such as the feedback voltage VFB and the feedback current IFB.

The auxiliary winding 56 is also magnetically coupled to the secondary winding S1. When the current through the diode 36 is zero, the voltage across the secondary winding S1 is equal to the voltage across the auxiliary winding 56. This relationship provides means for communicating the output voltage Vout as feedback to the primary side of the circuit. The voltage across the auxiliary winding 56 is measured when it is determined that the current through the diode 36 is zero, which provides a measure of the voltage across the secondary winding S1 and therefore the output voltage Vout.

The power converter can operate in a continuous conduction mode (CCM) or a discontinuous conduction mode (DCM). CCM is defined by continuous output current over the entire switching period, such as the switching period of the transistor 44. DCM is defined by discontinuous output current during any portion of the switching period. As described above, the feedback configuration used in FIG. 2 is effective for output voltage regulation when the power converter is operated in DCM, since it is when the output current is zero that an accurate determination of the output voltage Vout can be provided to the primary side controller.

FIG. 3 illustrates exemplary current and voltage diagrams as measured at given points of the power converter 32 of FIG. 2 during DCM operation. The graph 60 represents the switching signal VG, displayed in volts over time, applied to the transistor 44 which originates from the controller 42. The graph 60 is showing approximately a 50% duty cycle PWM driving signal, but it will be understood that any duty cycle could be used. The graph 70 shows the corresponding switch voltage VSW across the transistor 44 according to the switching signal VG. The switch voltage VSW is displayed in volts over time. The switch voltage VSW has peaks, such as the peak 61 and ringing effects such as a result of parasitics in both the transistor 44 and in the rest of the power converter 32. The graph 80 shows the primary current IP as a function of amps over time. The primary current IP is the current that flows through the primary winding P1 when the transistor 44 is on. The graph 90 shows the secondary current IS as a function of amps over time. The secondary current IS is the current that flows through the secondary winding S1 when the transistor 44 is off. At a time t=1, the gate of the transistor 44 is driven and the transistor is turned ON, or conducting. The switch voltage VSW approaches zero and the primary current IP ramps up thereby storing energy in the primary winding P1. At a time t=2, the transistor 44 is turned OFF, or non-conducting. As a result, energy stored in the primary winding P1 is transferred to the secondary winding S1. The secondary current IS begins ramping down as the stored energy is released until it reaches zero at time t=3. After a delay, the cycle begins anew at time t=4. At the time the secondary current IS reaches zero, the output voltage Vout is determined according to a measured voltage across the auxiliary winding 56.

Although using such a power converter in the DCM is effective for low to mid range power applications, using the power converter in DCM is not practical for higher power applications, such as those applications approaching or exceeding 20 watts, because such an architecture is not electrically efficient, is larger in size and is not cost effective. As such, using the power converter in the DCM for those applications having a relatively high average power, and also those applications having a relatively low or mid average power but durations of higher peak power, is not practical.

Operating the power converter of FIG. 2 in the CCM is also ineffective. Since there is non-zero secondary side current while operating in CCM, there are always voltage losses associated with the transforming winding resistance and the secondary side diode voltage drop. If the auxiliary winding voltage Vaux is used as a feedback signal as described above, it is difficult to compensate for these voltage losses and keep the output voltage in regulation when the primary side controller is operating in CCM during peak power demand.

SUMMARY OF THE INVENTION

A power converter has primary-side only control optimized for delivering a predefined amount of power at predetermined intervals. The power converter operates in DCM during periods of low and mid-power consumption and operates in CCM during periods of high, or peak, power consumption.

In a first aspect, a power converter for providing a regulated output voltage is disclosed. The power converter includes an isolation transformer, an output rectifier and a control module. The isolation transformer includes a primary side, a secondary side, and an auxiliary winding on the primary side. The output rectifier is coupled the secondary side to output the regulated output voltage. The control module is coupled to the primary side for determining a period of nominal power use and a period of high power use and configuring the power converter to operate in a discontinuous conduction mode during the period of nominal power use and to operate in a continuous conduction mode during the period of high power use.

In some embodiments, the power converter is a flyback converter. In other embodiments, the power converter is a buck/boost converter. In some embodiments, the power converter also includes a first switch and a second switch both controlled by the control module, wherein the first switch is on and the second switch is off during the period of nominal use and the second switch is on and the first switch is off during the period of high power use. In some embodiments, the power converter also includes a first voltage divider coupled to the auxiliary winding, having a first divided output voltage, and the control module includes a gate driver circuit configured to drive the power converter, a second voltage divider coupled to the first voltage divider, wherein the second voltage divider has a second voltage divider output voltage, a first switch coupled between the second voltage divider and the gate driver circuit, wherein the first switch is configured to selectively couple the second voltage divider to the gate driver circuit during the period of nominal power use, a second switch coupled to the second voltage divider, wherein the second switch is configured to selectively couple the second voltage divider to a negative power supply during the period of high power use, and a comparator coupled to the second voltage divider, wherein the comparator is configured to compare the second voltage divider output voltage to a reference signal, wherein an output of the comparator is coupled to the gate driver circuit.

In some embodiments, the power converter also includes a pulse width modulator coupled to the comparator, wherein the pulse width modulator is configured to modulate the output of the comparator. In some embodiments, the power converter also includes a level shifter coupled to an output of the pulse width modulator, wherein the level shifter is configured to level shift the modulated output of the pulse width modulator. In some embodiments, the power converter also includes an oscillator coupled to the pulse width modulator, wherein the oscillator is configured to increase a frequency of the pulse width modulator during the period of high power use. In some embodiments, the power converter also includes an adjusted resistor coupled between ground and a common node between the first voltage divider and the second voltage divider, wherein during the period of high power use current flows from ground through the adjusted resistor, the second voltage diver, the switch and to the negative power supply. In some embodiments, a resistance value of the adjusted resistor is set to a value such that during the period of high power use the second voltage divider output voltage has a voltage that results in regulating the output voltage.

In another aspect, a method of controlling a power converter is disclosed. The method includes configuring the power converter with an isolation transformer having a primary side, a secondary side, and an auxiliary winding on the primary side, wherein a regulated output voltage is provided on the secondary side. The method also includes determining a period of nominal power use and a period of high power use. The method also includes operating the power converter in a discontinuous conduction mode during the period of nominal power use and operating the power converter in a continuous conduction mode during the period of high power use.

In some embodiments, determining the period of nominal use and the period of high power use includes monitoring a feedback voltage that is a function of an auxiliary winding voltage. In some embodiments, determining the period of nominal use and the period of high power use also includes comparing the feedback voltage to a threshold voltage, wherein if the feedback back is equal to or greater than the threshold voltage then it is determined to be the period of nominal use and if the feedback voltage is less than the threshold voltage then it is determined to be the period of high power use. In some embodiments, the method also includes enabling a first signal generation path to generate a first driving signal for driving the power converter during the period of nominal use and enabling a second signal generation path to generate a second driving signal for driving the power converter during the period of high power use. In some embodiments, enabling the first signal generation path includes turning on a first switch and turning off a second switch during the period of nominal use, and enabling the second signal generation path includes turning off the first switch and turning on the second switch during the period of high power use. In some embodiments, when the second signal generation path is enabled the method also includes comparing a feedback signal to a negative reference value to generate a difference value. In some embodiments, when the second signal generation path is enabled the method also includes using a pulse width modulator to modulate the output of the difference value. In some embodiments, when the second signal generation path is enabled the method also includes level shifting a modulated output of the pulse width modulator. In some embodiments, when the second signal generation path is enabled the method also includes increasing a frequency of the pulse width modulator. In some embodiments, the second signal generation path includes an adjusted resistor, and the feedback signal includes a feedback voltage that is a function of a resistance value of the adjusted resistor. In some embodiments, the resistance value of the adjusted resistor is set so that the output voltage is regulated when the power converter is operating in the continuous conduction mode. In some embodiments, when the first signal generation path is enabled the method also includes using a feedback voltage that is a function of an auxiliary winding voltage to regulate the output voltage. In some embodiments, operating the power converter in the continuous conduction mode includes connecting a circuit pathway to a negative power supply, and operating the power converter in the discontinuous conduction mode includes disconnecting the circuit pathway to the negative power supply.

Other features of the present invention will become apparent from consideration of the following description taken in conjunction with the accompanying drawings.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION

Embodiments of the present application are directed to a power converter. Those of ordinary skill in the art will realize that the following detailed description of the power converter is illustrative only and is not intended to be in any way limiting. Other embodiments of the power converter will readily suggest themselves to such skilled persons having the benefit of this disclosure.

Reference will now be made in detail to implementations of the power converter as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of a power converter include a primary side controller configured to operate the power converter in the DCM during low to mid-power requirements and to operate the power converter in the CCM during high or peak power requirements. In addition to the primary side controller, the power converter includes a primary side auxiliary winding for providing a feedback signal to the primary side controller, and an adjusted resistor and diode circuit which is coupled to a multi-function feedback (FB) pin of the primary side controller. The primary side controller monitors for a peak power demand, upon detection of which a negative supply rail is enabled, which is used to compensate for voltage losses due to non-zero current while operating in the CCM, thereby enabling output voltage regulation while operating in the CCM during peak power demand. In some embodiments, when the primary side controller operates in the CCM, a maximum switching frequency is also enabled to limit peak primary current. This allows the power converter to be designed with a limited size transformer while delivering peak power on demand for a certain time period.

Figure 4:
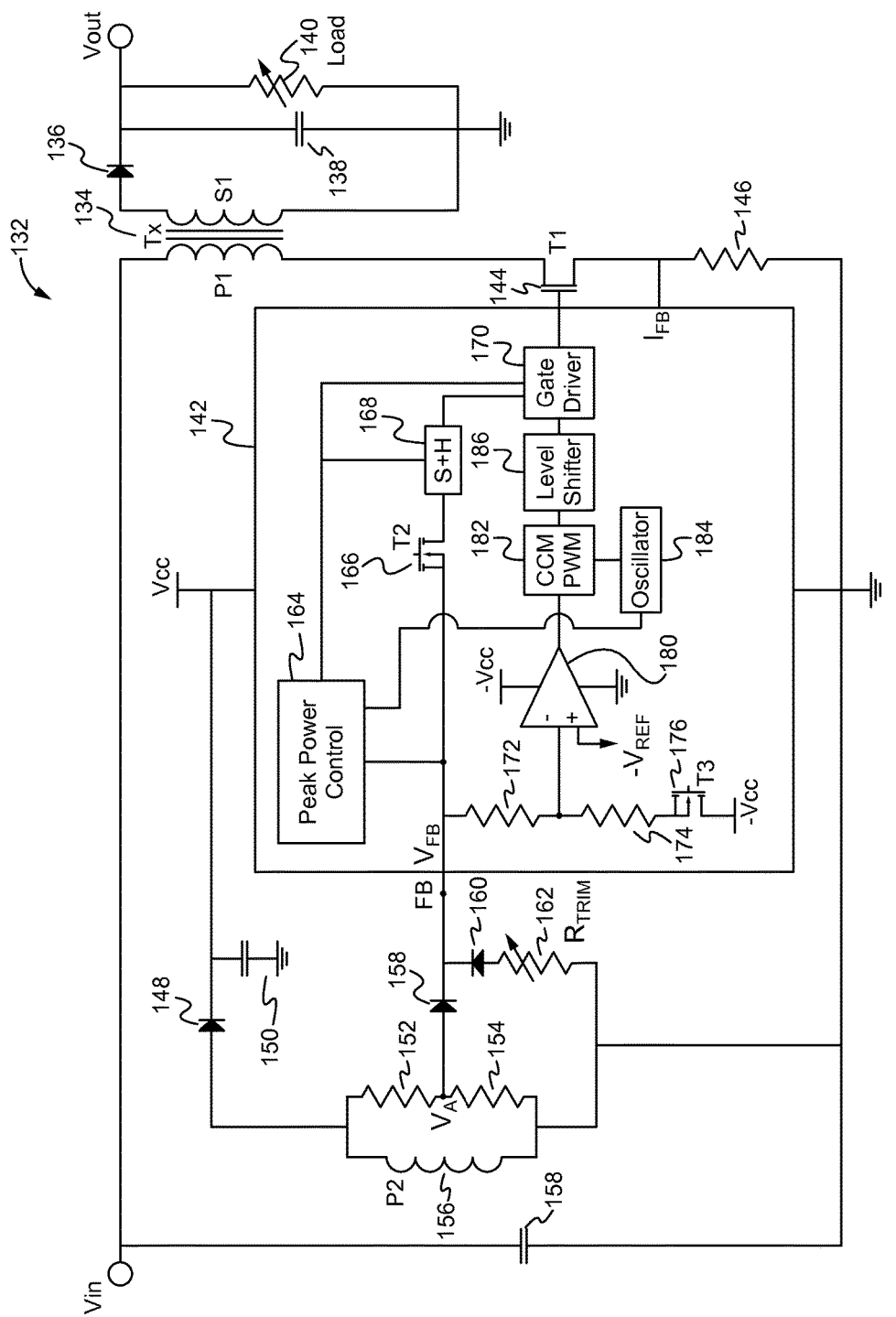
FIG. 4 illustrates a regulated power converter according to an embodiment.

FIG. 4 illustrates a regulated power converter according to an embodiment. The power converter 132 is configured as a flyback type converter. The power converter 132 includes an isolation transformer 134 having a primary winding P1 and a secondary winding S1. The primary winding P1 is electrically coupled to an input voltage Vin and a driving circuit including a transistor 144, a resistor 146, and a controller 142. A capacitor 158 is coupled across the input Vin and coupled with the primary winding P1. Input voltage to the circuit may be unregulated DC voltage derived from an AC supply after rectification and filtering. The transistor 144 is a fast-switching device controlled by the fast dynamic controller 142 to maintain a desired output voltage Vout. The secondary winding voltage is rectified and filtered using the diode 136 and the capacitor 138, with the output voltage Vout delivered to the load 140.

The power converter 132 has a feedback loop that includes a magnetically coupled feedback circuit coupled to the secondary winding S1 of the transformer 134 and the controller 142. The magnetically coupled feedback circuit includes a diode 148, a capacitor 150, resistors 152 and 154 and an auxiliary winding 156. The auxiliary winding 156 is coupled in parallel to the series of resistors 152 and 154.

The voltage VA is proportional to the voltage across the auxiliary winding 56. The voltage at the multi-function feedback (FB) pin is provided as a feedback voltage VFB to the controller 142. The current through the transistor 144 is also provided as feedback current IFB to the controller 142. The controller 142 includes a real-time waveform analyzer that analyzes input feedback signals, such as the feedback voltage VFB and the feedback current IFB.

The auxiliary winding 156 is also magnetically coupled to the secondary winding S1. During normal operation, which corresponds to low to mid power demands by the load 140, the power converter 132 operates in the DCM. In the DCM, when the current through the diode 136 is zero, the voltage across the secondary winding S1 is equal or proportional to the voltage across the auxiliary winding 156. This relationship provides means for communicating the output voltage Vout as feedback to the primary side of the circuit. The voltage across the auxiliary winding 156 is measured when it is determined that the current through the diode 136 is zero, which provides a measure of the voltage across the secondary winding S1 and therefore the output voltage Vout. The controller 142 adjusts the PWM signal provided to the transistor 144, thereby adjusting the switching frequency, to regulate the output voltage Vout.

The power converter 132 also includes a diode 158 coupled between the voltage divider formed by the resistors 152 and 154 and the feedback pin FB of the controller 142. A diode 160 and an adjusted resistor 162 are coupled in series. The diode 160 is also coupled to the feedback pin FB of the controller 142.

The controller 142 includes a peak power control module 164, a transistor 166, a sample and hold circuit 168, a gate driver circuit 170, resistors 172 and 174, a transistor 176, a comparator 180, a CCM PWM circuit 182, an oscillator circuit 184 and a level shifter circuit 186. The resistors 172 and 174 form a voltage divider which is coupled as one input to the comparator 180. The transistor 176 is coupled in series with the resistor 174 and to a negative voltage supply −Vcc. The comparator 180 receives as a second input a negative reference voltage −Vref. The output of the comparator 180 is input to the CCM PWM circuit 182 wherein the PWM signal for the gate driver circuit 170 is generated. The frequency of the CCM PWM circuit 182 is controlled by the oscillator circuit 184. The PWM signal output from the CCM PWM circuit 182 is input to the level shifter circuit 186. The level shifter circuit 186 is used because of the negative voltage values used to generate the PWM signal, namely the negative power supply −Vcc and the negative reference voltage −Vref. The level shifted PWM signal is input to the gate driver circuit 170 which is used to drive the transistor 144.

The controller 142 is configured to operate the power converter 132 in DCM during low to mid power requirements and to operate the power converter 132 in CCM during peak power requirements. Many loads, such as printers or scanners, have varied power requirements depending on the particular function being performed. Many if not most of the functions have low to mid power requirements and can be performed with the power converter 132 is operating in the DCM. Operating in the DCM to perform such low to mid power requirement functions is referred to as normal operation.

The peak power control module 164 monitors when a peak power demand is made by the load 140. In some embodiments, the peak power controller 164 determines that a peak power demand is made when the feedback voltage VFB sags below a threshold voltage. Such a sag occurs when a large amount of power is demanded from a power converter operating in DCM. Voltage levels equal to or greater than the threshold voltage indicate normal operation.

Figure 1:
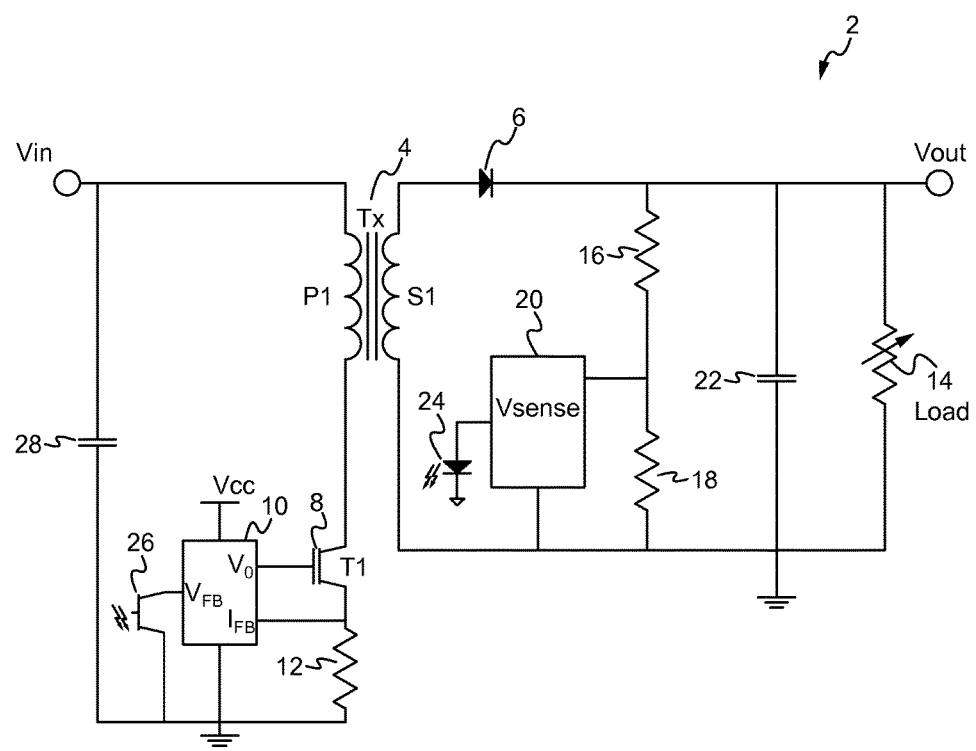
FIG. 1 illustrates a conventional regulated switch mode power converter including an optical coupler circuit.
Figure 2:
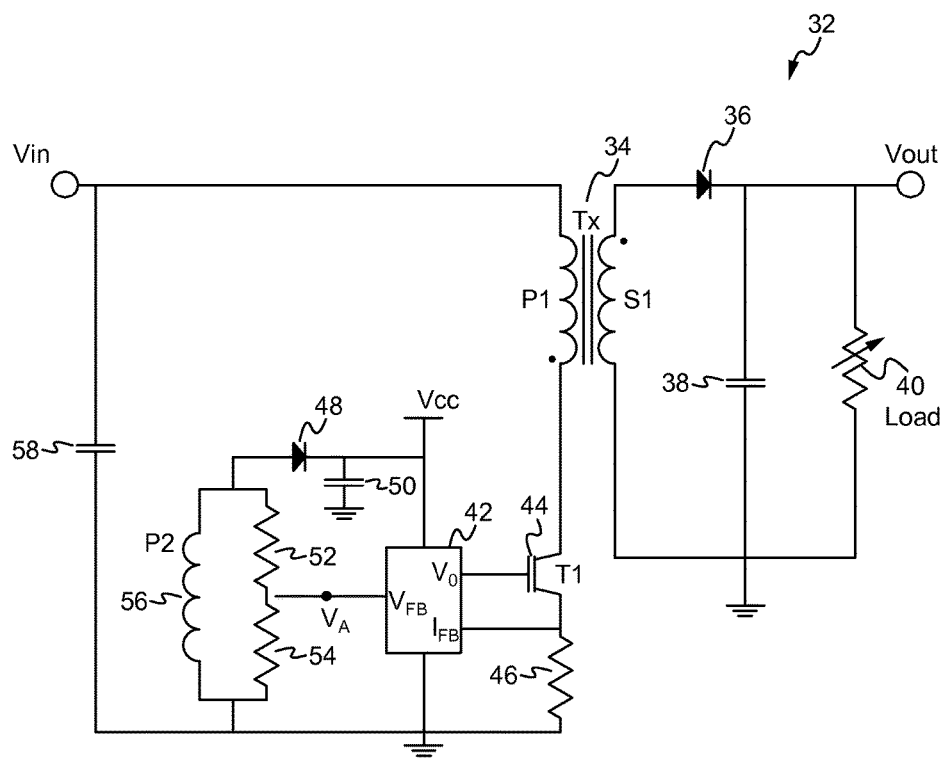
FIG. 2 illustrates a conventional regulated power converter including a magnetically coupled feedback circuit.
Figure 3:
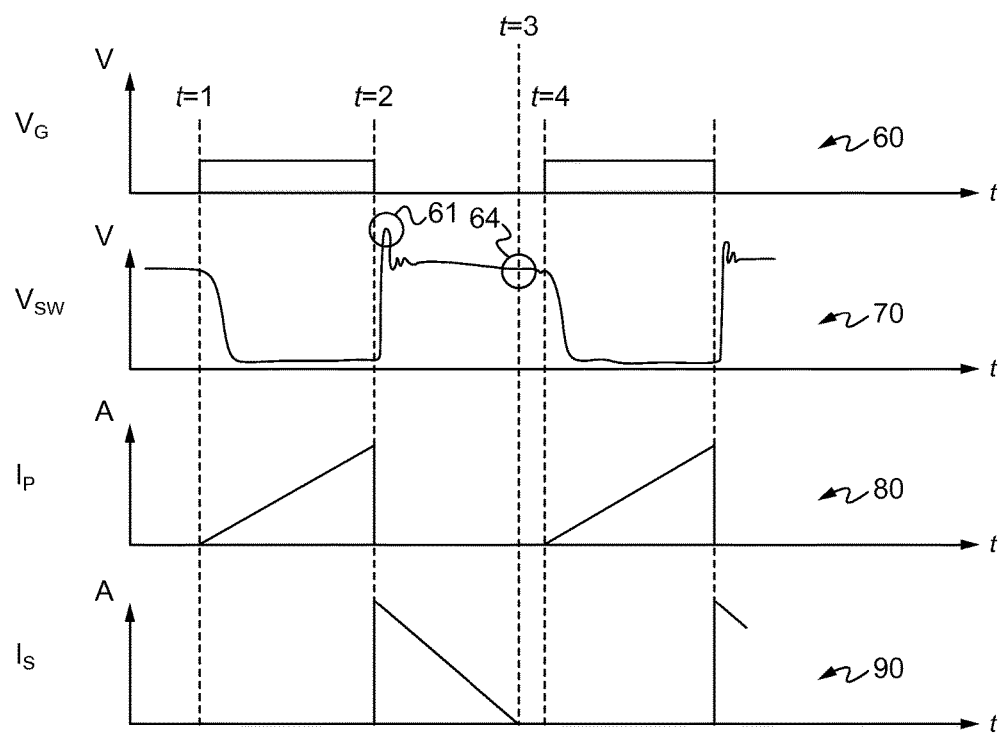
FIG. 3 illustrates exemplary current and voltage diagrams as measured at given points of the power converter 32 of FIG. 2 during DCM operation.

During normal operation, the peak power control module 164 keeps the transistor 176 OFF and the transistor 166 ON. When the transistor 176 is OFF, no current flows through the diode 160 and the adjusted resistor 162, and no current flows through the transistor 176 and the resistors 172 and 174. As such, there is no feedback signal detected at the negative input of the comparator 180. In this case, the signal path from the comparator 180, the CCM PWM circuit 182, the level shifter circuit 186 to the gate driver circuit 170 is disabled. With the transistor 166 ON, the feedback signal, represented as feedback voltage VFB is supplied to the sample and hold circuit 168 for further processing. The processed feedback signal is then supplied to the gate driver circuit 170. In this manner, during normal operation the power converter 132 functions similarly as a conventional power converter that uses a magnetically coupled auxiliary winding to measure and regulate the output voltage Vout. In some embodiments, the controller 142 includes a real-time waveform analyzer that analyzes input feedback signals, such as the feedback voltage VFB and the feedback current IFB. Exemplary waveform patterns corresponding to normal operations are similar to those shown in FIG. 3.

Figure 5:
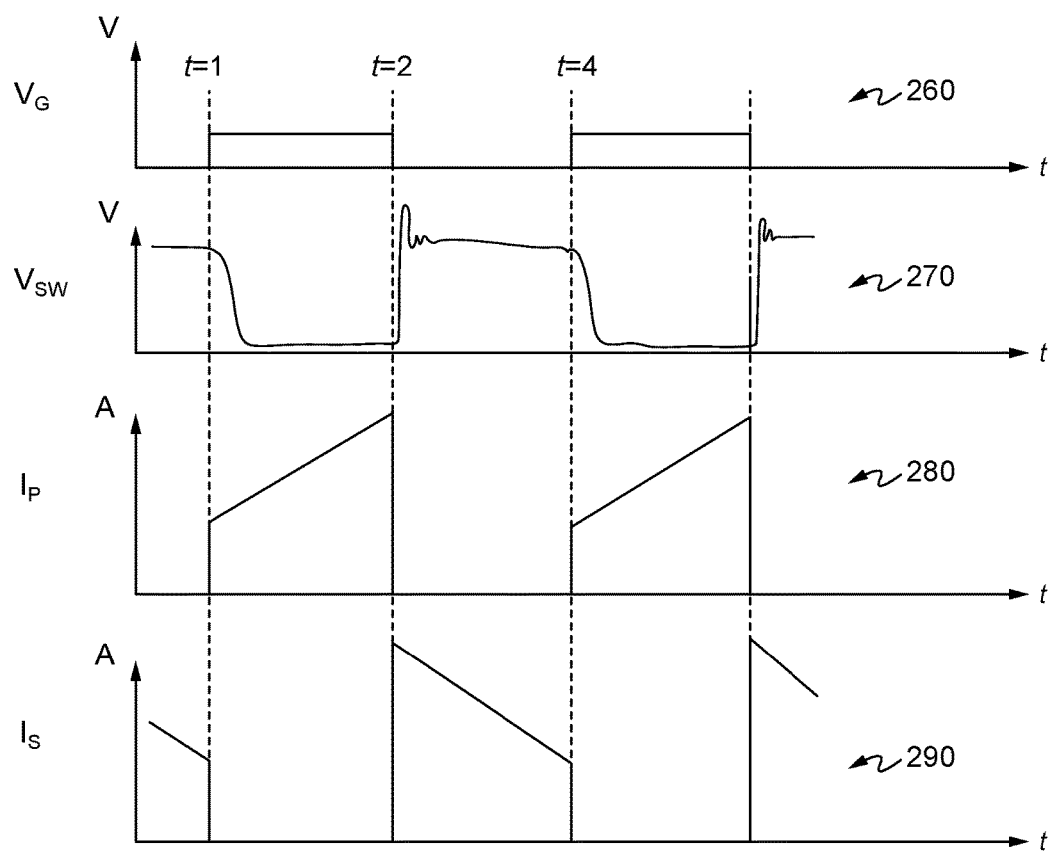
FIG. 5 illustrates exemplary current and voltage diagrams as measured at given points of the power converter 132 of FIG. 4 during CCM operation.

Certain functions, such as the paper scrolling function of a printer that requires the use of a motor, have a high or peak power requirement that exceeds the effective range of the power converter operating in the DCM. For such peak power functionality, operation in the CCM is desired. FIG. 5 illustrates exemplary current and voltage diagrams as measured at given points of the power converter 132 of FIG. 4 during CCM operation. The graph 260 represents the switching signal VG, displayed in volts over time, applied to the transistor 144 which originates from the controller 142. The graph 260 is showing approximately a 50% duty cycle PWM driving signal, but it will be understood that any duty cycle could be used. The graph 270 shows the corresponding switch voltage VSW across the transistor 144 according to the switching signal VG. The switch voltage VSW is displayed in volts over time. The graph 280 shows the primary current IP as a function of amps over time. The primary current IP is the current that flows through the primary winding P1 when the transistor 144 is ON. During CCM of operation, the primary current IP starts at a non-zero value and ramps upward. The graph 290 shows the secondary current IS as a function of amps over time. The secondary current IS is the current that flows through the secondary winding S1 when the transistor 144 is OFF. During CCM of operation, the secondary current IS ramps downward to a non-zero value. At a time t=1, the gate of the transistor 144 is driven and the transistor is turned ON. The switch voltage VSW approaches zero and the primary current IP ramps up from a starting non-zero value thereby storing energy in the primary winding P1. At a time t=2, the transistor 144 is turned OFF. As a result, energy stored in the primary winding P1 is transferred to the secondary winding S1. The secondary current IS begins ramping downward as the stored energy is released. At time t=4 the cycle begins anew.

Since operating in the CCM results in non-zero secondary side current, there are always losses associated with winding resistance and secondary side diode voltage drop. For primary side control, using the auxiliary winding information as a feedback signal for output voltage regulation, such as the technique used during normal operation, it is difficult to compensate the feedback signal for these losses and keep the output voltage Vout in regulation when the controller 142 is operating in CCM during peak power demand.

To overcome this issue related to compensation of the feedback signal, compensation is provided through the use of the adjusted resistor 162 coupled to the feedback pin FB and through enabling a negative power supply rail at the negative power supply −Vcc. In some embodiments, peak power operation is enabled when the feedback voltage VFB sags below the threshold voltage. During peak power operation, the transistor 166 is turned OFF and the transistor 176 is turned ON. When the transistor 166 is OFF, no current flows through the transistor 166 and as such, there is no feedback signal detected at the sample and hold circuit 168. In this case, the signal path through the transistor 166 and the sample and hold circuit 168 to the gate driver circuit 170 is disabled. Instead, turning OFF the transistor 166 and turning ON the transistor 176 enables a secondary feedback signal path to the gate driver circuit 170 via the comparator 180, the CCM PWM circuit 182 and the level shifter circuit 186.

Turning ON the transistor 176 enables the negative supply rail at the negative power supply −Vcc. Since the adjusted resistor 162 is coupled to ground, current flows from ground, through the adjusted resistor 162 and the diode 160, into the controller 142 through the feedback pin FB, through the resistors 172 and 174, the transistor 176 and to the negative supply −Vcc. Current through the voltage divider formed by the resistors 172 and 174 provides a voltage proportional to the feedback voltage VFB supplied at the feedback pin FB. However, when in peak power operation (CCM), the feedback voltage VFB at the feedback pin FB is no longer the voltage VA, and as such does not represent the voltage across the auxiliary winding 156 as in normal operation. Instead, the feedback voltage VFB at the feedback pin FB is a function of the resistance value of the adjusted resistor 162. In some embodiments, the resistance value of the adjusted resistor 162 is set during assembly of the power converter 132. In this case, the power converter 132 is stressed under peak power loading. Concurrently, the output voltage Vout is monitored and the resistance value of the adjusted resistor 162 is adjusted until monitored output voltage Vout is in regulation. For example, the adjusted resistor 162 is laser trimmed until the monitored output voltage Vout is in regulation. In other embodiments, the adjusted resistor 162 represents an impedance that can be adjusted according to real-time operating conditions so as to regulate the output voltage Vout when operating in the CCM.

In some embodiments, the peak primary current is limited so as to limit the transformer size. To limit the peak primary current during peak power operation, a maximum switching frequency is implemented by the oscillator circuit 184. For example, when a power demand is increased from a mid-power level to a peak power lever, the frequency supplied by the oscillator 184 to the CCM PWM circuit 182 is correspondingly increased, thereby maintaining the same peak current value during the peak power operation as during the mid-power operation. In some embodiments, during peak power operation the load and the switching frequency is fixed and maximum for a fixed period of time, such as during the paper scroll function of a printer.

It is understood that the power converter can be configured as an alternative type of converter than the flyback converter described above. For example the power converter can be configured as a buck/boost converter.

The present application has been described in terms of specific embodiments incorporating details to facilitate the understanding of the principles of construction and operation of the power converter. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A power converter for providing a regulated output voltage, the power converter comprising:
  a. an isolation transformer comprising a primary side, a secondary side, and an auxiliary winding on the primary side;
  b. a main switch coupled to the primary side;
  c. an output rectifier coupled the secondary side to output the regulated output voltage; and
  d. a control module coupled to the primary side for determining a period of nominal power use and a period of high power use and configuring the power converter to operate in a discontinuous conduction mode during the period of nominal power use and to operate in a continuous conduction mode during the period of high power use, wherein the control module comprises a gate driver circuit, a first switch and a second switch, wherein the gate driver circuit is configured to drive the main switch, further wherein the first switch is ON and the second switch is OFF during the period of nominal power use thereby enabling a first signal generation path to the gate driver circuit and disabling a second signal generation path to the gate driver circuit, further wherein the first switch is OFF and the second switch is ON during the period of high power use thereby enabling the second signal generation path and disabling the first signal generation path, wherein the second signal generation path includes connection to a negative power supply.

2. The power converter of claim 1 wherein the power converter is a flyback converter.

3. The power converter of claim 1 wherein the power converter further comprises a first voltage divider coupled to the auxiliary winding, having a first divided output voltage, and the control module comprises:
   a. the gate driver circuit configured to drive the main switch,
   b. a second voltage divider coupled to the first voltage divider, wherein the second voltage divider has a second voltage divider output voltage;
   c. the first switch coupled between the first voltage divider and the gate driver circuit, wherein the first switch is configured to couple the first voltage divider to the gate driver circuit during the period of nominal power use;
   d. the second switch coupled to the second voltage divider, wherein the second switch is configured to couple the second voltage divider to the negative power supply during the period of high power use; and
   e. a comparator coupled to the second voltage divider, wherein the comparator is configured to compare the second voltage divider output voltage to a reference signal, wherein an output of the comparator is coupled to the gate driver circuit.

4. The power converter of claim 3 further comprising a pulse width modulator coupled to the comparator, wherein the pulse width modulator is configured to modulate the output of the comparator.

5. The power converter of claim 4 further comprising a level shifter coupled to an output of the pulse width modulator, wherein the level shifter is configured to level shift the modulated output of the pulse width modulator.

6. The power converter of claim 4 further comprising an oscillator coupled to the pulse width modulator, wherein the oscillator is configured to increase a frequency of the pulse width modulator during the period of high power use.

7. The power converter of claim 3 further comprising an adjusted resistor coupled between ground and a common node between the first voltage divider and the second voltage divider, wherein during the period of high power use current flows from ground through the adjusted resistor, the second voltage divider, the second switch and to the negative power supply.

8. The power converter of claim 7 wherein a resistance value of the adjusted resistor is set to a value such that during the period of high power use the second voltage divider output voltage has a voltage that results in regulating the output voltage.

9. A method of controlling a power converter comprising:
   a. configuring the power converter with an isolation transformer having a primary side, a secondary side, and an auxiliary winding on the primary side, wherein a regulated output voltage is provided on the secondary side;
   b. determining a period of nominal power use and a period of high power use; and
   c. operating the power converter in a discontinuous conduction mode during the period of nominal power use and enabling a first signal generation path to generate a first driving signal for driving the power converter during the period of nominal use, and operating the power converter in a continuous conduction mode during the period of high power use and enabling a second signal generation path to generate a second driving signal for driving the power converter during the period of high power use, wherein enabling the first signal generation path comprises turning ON a first switch and turning OFF a second switch during the period of nominal use, and enabling the second signal generation path comprises turning OFF the first switch and turning ON the second switch during the period of high power use, wherein the second signal generation path includes connection to a negative power supply.

10. The method of claim 9 wherein determining the period of nominal use and the period of high power use comprises monitoring a feedback voltage that is a function of an auxiliary winding voltage.

11. The method of claim 10 wherein determining the period of nominal use and the period of high power use further comprises comparing the feedback voltage to a threshold voltage, wherein if the feedback voltage is equal to or greater than the threshold voltage then it is determined to be the period of nominal use and if the feedback voltage is less than the threshold voltage then it is determined to be the period of high power use.

12. The method of claim 9 wherein when the second signal generation path is enabled the method further comprises comparing a feedback signal to a negative reference value to generate a difference value.

13. The method of claim 12 wherein when the second signal generation path is enabled the method further comprises using a pulse width modulator to modulate the output of the difference value.

14. The method of claim 13 wherein when the second signal generation path is enabled the method further comprises level shifting a modulated output of the pulse width modulator.

15. The method of claim 14 wherein when the second signal generation path is enabled the method further comprises increasing a frequency of the pulse width modulator.

16. The method of claim 12 wherein the second signal generation path comprises an adjusted resistor, and the feedback signal comprises a feedback voltage that is a function of a resistance value of the adjusted resistor.

17. The method of claim 16 wherein the resistance value of the adjusted resistor is set so that the output voltage is regulated when the power converter is operating in the continuous conduction mode.

18. The method of claim 9 wherein when the first signal generation path is enabled the method further comprises using a feedback voltage that is a function of an auxiliary winding voltage to regulate the output voltage.

19. The method of claim 9 wherein when the second signal generation path is enabled the second signal generation path is connected to the negative power supply.

* * * * *